United States Patent
Huang et al.

(10) Patent No.: US 12,034,287 B1
(45) Date of Patent: Jul. 9, 2024

(54) ROTATIONAL COUPLING FOR ELECTRICAL SYSTEMS

(71) Applicant: Guangzhou Panyu Target Casting & Lighting Corp., Guangzhou (CN)

(72) Inventors: Zhiping Huang, Panyu (CN); Robert Lee, Guangzhou (CN)

(73) Assignee: Guangzhou Panyu Target Casting and Lighting Corporation, Guangzhou (CN)

( * ) Notice: Subject to any disclaimer, the term of this patent is extended or adjusted under 35 U.S.C. 154(b) by 41 days.

(21) Appl. No.: 17/529,087

(22) Filed: Nov. 17, 2021

Related U.S. Application Data

(60) Provisional application No. 63/093,383, filed on Oct. 19, 2020.

(51) Int. Cl.
*H02G 3/06* (2006.01)

(52) U.S. Cl.
CPC .................... *H02G 3/06* (2013.01)

(58) Field of Classification Search
CPC ........................................ H02G 3/06
USPC ........................................... 174/86
See application file for complete search history.

(56) References Cited

U.S. PATENT DOCUMENTS

| | | | | |
|---|---|---|---|---|
| 2,488,898 A | * | 11/1949 | Brasty | F21V 21/26 362/427 |
| 4,381,538 A | * | 4/1983 | Warshawsky | F21V 21/26 362/427 |
| 4,449,169 A | * | 5/1984 | Warshawsky | F21S 6/003 362/418 |
| 4,449,172 A | * | 5/1984 | Warshawsky | F21V 21/26 362/418 |
| 4,473,874 A | * | 9/1984 | Warshawsky | F21V 21/26 362/427 |
| 4,726,552 A | * | 2/1988 | Warshawsky | F21S 6/002 362/427 |
| 4,821,159 A | * | 4/1989 | Pike | F16M 11/2014 362/427 |
| 4,880,193 A | * | 11/1989 | Warshawsky | F21V 21/26 362/427 |
| 6,280,056 B1 | * | 8/2001 | Dolan | F21V 21/26 362/427 |
| 7,210,811 B1 | * | 5/2007 | Swanson | F21S 8/04 362/147 |
| 8,226,419 B2 | * | 7/2012 | Fonzo | H01R 35/02 439/31 |
| 9,945,498 B2 | * | 4/2018 | Timoszyk | A61B 90/30 |
| 10,851,938 B2 | * | 12/2020 | Glickstein | F16M 11/26 |
| 2012/0326439 A1 | * | 12/2012 | Bogert | F16L 19/12 285/354 |
| 2018/0228680 A1 | * | 8/2018 | Oginski | F16M 11/2014 |
| 2020/0003359 A1 | * | 1/2020 | Vlaar | F16M 11/2014 |

* cited by examiner

*Primary Examiner* — Timothy J Thompson
*Assistant Examiner* — Michael F McAllister
(74) *Attorney, Agent, or Firm* — DeWitt LLP; Brian R. Pollack, Esq.

(57) ABSTRACT

The present disclosure is generally directed to visually aesthetic rotational components for electrical systems, such as lighting systems that facilitate the assembly and operation of luminaires with rotating components.

20 Claims, 4 Drawing Sheets

ROTATIONAL COUPLING FOR ELECTRICAL SYSTEMS

CROSS-REFERENCE TO RELATED APPLICATION

This patent application is related to and claims the benefit of priority to U.S. Provisional Application Ser. No. 63/093,383, filed Oct. 19, 2020. The disclosure of the foregoing patent application is expressly incorporated by reference herein for any purpose whatsoever.

BACKGROUND

Various electrical systems, such as lighting systems, can be made from multiple components that can be coupled to each other. The present disclosure includes improvements over the current state of the art.

SUMMARY OF THE DISCLOSURE

In accordance with some implementations, the disclosure provides implementations of an electrical device including a rotational component having a boss rotationally disposed in a socket. In various implementations, the boss can define a circumferential groove about an exterior surface thereof. The circumferential groove can be received within the socket. The socket can include a protrusion that extends into the circumferential groove to permit the boss to rotate within the socket to form a rotatable connection between the boss and the socket, but prevents the boss from being pulled out of the socket.

In some implementations, the protrusion can include a ball that resides in a bore defined in a wall. The bore can at least partially define the socket. The bore can be threaded, and can include a set screw disposed therein that maintains the ball in engagement with the circumferential groove to trap the boss in the socket. The circumferential groove can be oriented orthogonally with respect to an axis of rotation of the boss within the socket. The circumferential groove can traverse 360 degrees around the boss. If desired, the circumferential groove can traverse less than 360 degrees around the boss to provide a range of rotational motion for the boss.

In some implementations, an external portion of the bore can be visually obscured from a viewer by another portion of the electrical device when the electrical device is assembled. The boss can define a lengthwise bore through which an insulated electrical conductor can be directed. If desired, the ball can be made from metal and/or polymeric material, as desired.

In some implementations, the electrical device can be a lighting device, including but not limited to a lamp, or a luminaire. The electrical device can be a tool, such as a power tool such as an articulating light, a drill, a saw, an electric screwdriver, and the like. If desired, the lighting device can include a portion of a vehicle, such as a mirror, or display panel mount. In some embodiments, the lighting device can include a piece of furniture, such as a lamp. In other implementations, the electrical device can include an electrical appliance or an articulating arm for a robot.

It is to be understood that both the foregoing general description and the following detailed description are exemplary and are intended to provide further explanation of the embodiments disclosed herein.

The accompanying drawings, which are incorporated in and constitute part of this specification, are included to illustrate and provide a further understanding of the method and system of the disclosure. Together with the description, the drawings serve to explain the principles of the disclosed embodiments.

BRIEF DESCRIPTION OF THE DRAWINGS

The foregoing and other objects, aspects, features, and advantages of exemplary embodiments will become more apparent and may be better understood by referring to the following description taken in conjunction with the accompanying drawings, in which.

DETAILED DESCRIPTION

Figure 1B:
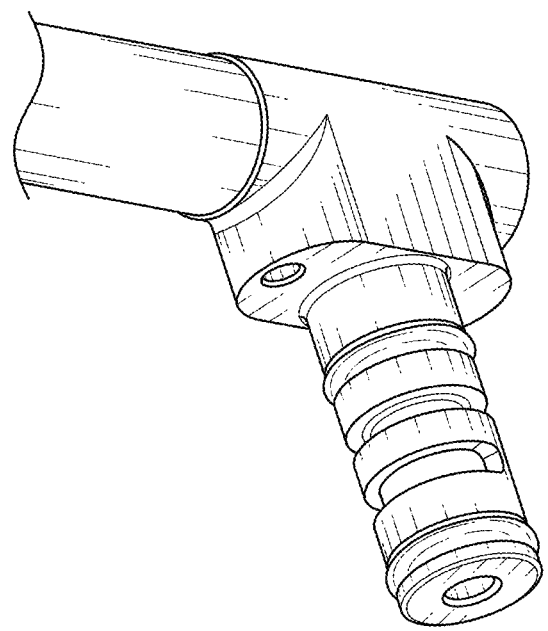
FIG. 1B depicts a disassembled rotational joint in accordance with the present disclosure.
Figure 1A:
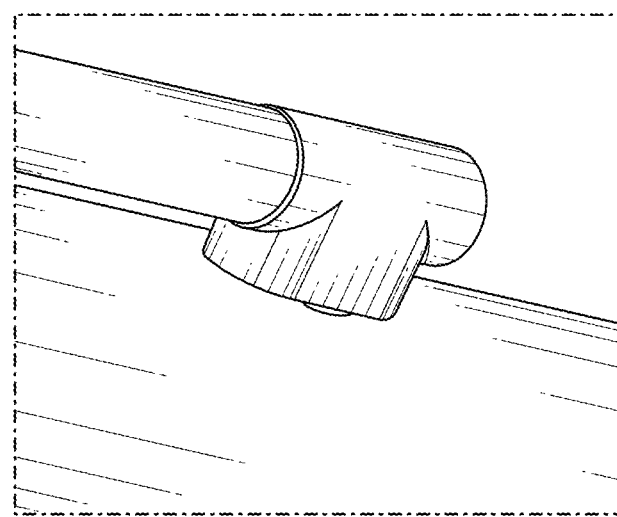
FIG. 1A depicts an assembled rotational joint in accordance with the present disclosure.
Figure 2B:
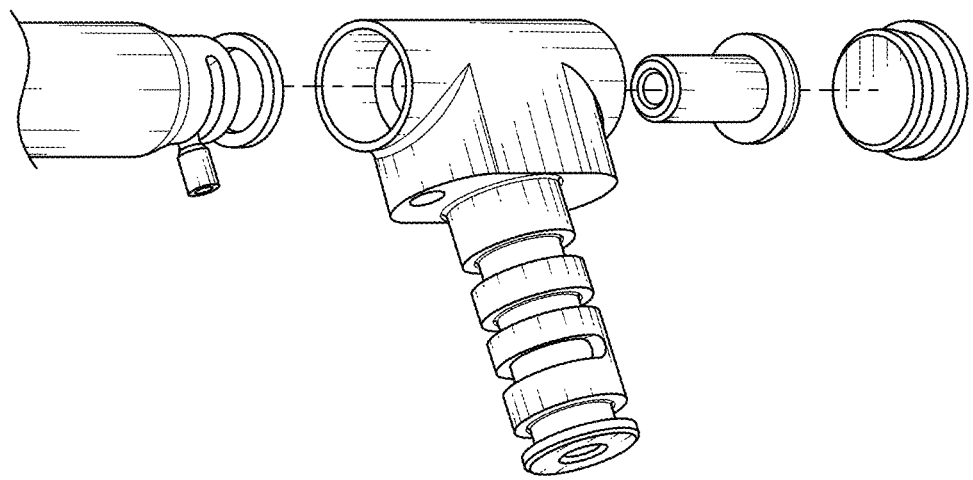
FIGS. 2A and 2B depict exploded views of a rotational joint in accordance with the present disclosure.
Figure 2A:
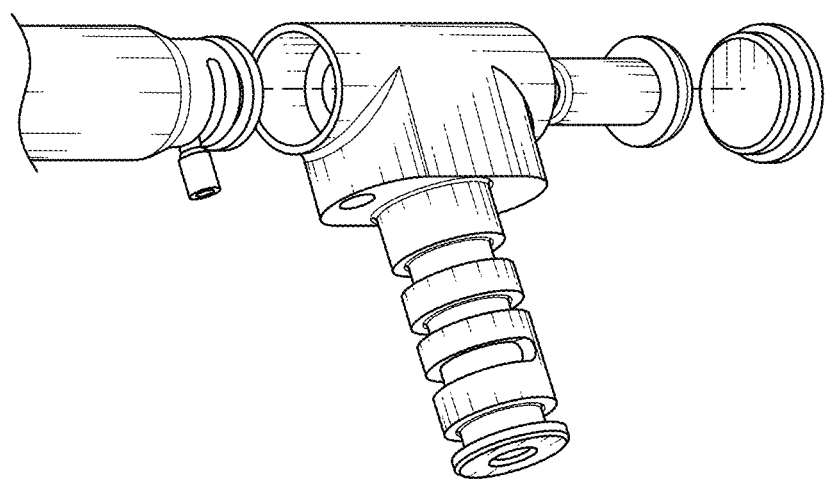

The present disclosure is generally directed to electrical devices having rotational joints that permit adjustment and articulation of portions of the electrical device. If the electrical device is a lighting device, the articulation or rotation can be utilized to aim the direction of light propagation by a user, for example. Many conventional systems include unsightly and/or crude rotational adjustments. The present disclosure provides implementations of an electrical device that address the aforementioned shortcomings in the art, as set forth below.

The disclosure provides implementations of an electrical device including a rotational component having a boss rotationally disposed in a socket. For purposes of illustration, and not limitation, FIGS. 1A-4B illustrate an embodiment of a portion of such an electrical device. As illustrated, and with specific reference to FIGS. 3A and 3B, a boss 20 defines a circumferential groove 10 therein about an exterior surface thereof, the circumferential groove being received within a socket 30. As illustrated, the socket is provided with a protrusion 40 (a ball, as illustrated), that extends into the circumferential groove 10 to permit the boss 20 to rotate within the socket 30 to form a rotatable connection between the boss 20 and the socket 30, but prevents the boss 20 from being pulled out of the socket 30.

As illustrated, the protrusion can include a ball or another object with a rounded end that resides in a bore defined in or through a wall that at least partially defines the socket. The wall in the illustrated embodiment includes a T-shaped connector 50 that includes a portion having o-rings that is received within an opening 62 defined within a frame or a mount 60 of an electrical device.

As illustrated in the figures, the bore that receives the protrusion (e.g., ball) is threaded, and includes a set screw disposed therein that maintains the ball in engagement with the circumferential groove to trap the boss 20 in the socket 30. As illustrated, the circumferential groove 10 is oriented orthogonally with respect to an axis of rotation of the boss within the socket. The protrusion can alternatively be a pin with a rounded tip or a set screw with a rounded distal tip to engage the groove 10. The protrusion can be made from metal or plastic, as desired.

In some implementations, the groove can be continuous and form a ring around the boss. For example, the circumferential groove can traverse 360 degrees around the boss. In the illustrated embodiment of FIGS. 4A-4B however, the circumferential groove 10 traverses about 180 degrees of the extent of the boss 20. This permits for a range of rotation of 180 degrees of the boss with respect to the socket. It will be appreciated that the extent of the annular groove can vary, for example, from about 45 degrees to about 360 degrees in increments of one degree.

Figure 3B:
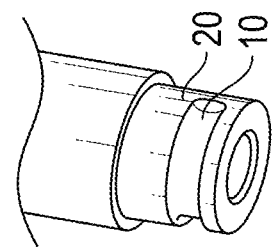
FIGS. 3A and 3B depict enlarged exploded views of a rotational joint in accordance with the present disclosure.
Figure 3A:
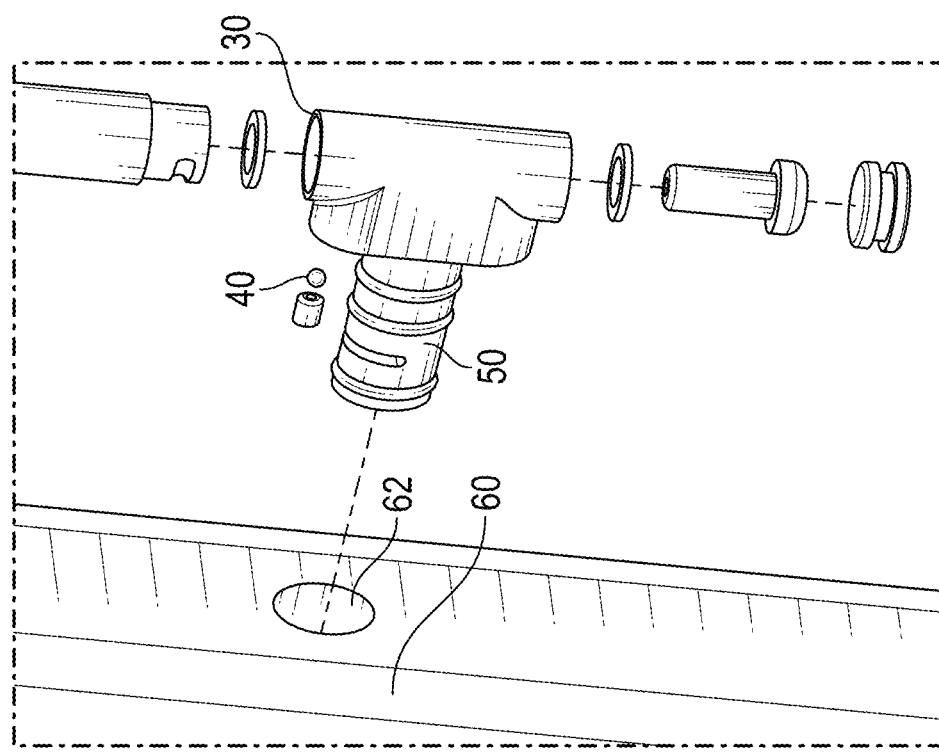
Figure 4B:
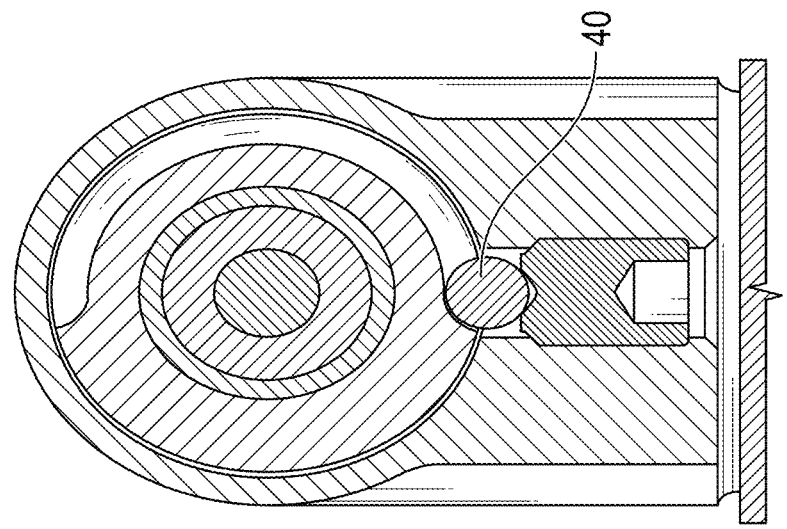
FIGS. 4A and 4B depict cross-sectional views of a rotational joint in accordance with the present disclosure.
Figure 4A:
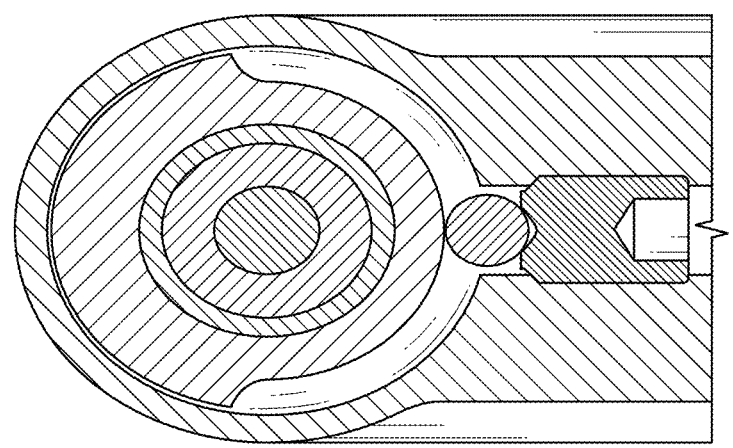

As illustrated in FIGS. 3A-3B, the bore that holds the protrusion is defined in component 50 in a manner wherein the external opening of the bore actually faces and is obscured by another component (e.g., 60) of the electrical device when assembled. This provides for a more aesthetic design, and it also helps to prevent the set screw from backing out of the bore, since it would otherwise collide with component 60. Thus, using the illustrated embodiments permits keeping the mechanism to retain the boss in bore hidden and internal. As is further illustrated, various components of the joint, including the T-connector 50 and the boss 20 define bores along their interior lengths to permit passage of a fastener therethrough. Such a bore can alternatively be used to pass an electrical conductor through. These construction arrangements and techniques can thus be used to provide a sleek electrical device, such as a luminaire, that keeps the means of mechanical assembly and operation internal, and hidden to an observer.

The systems and methods of the present disclosure, as described above and shown in the drawings provide for improved electrical devices. It will be apparent to those skilled in the art that various modifications and variations can be made in the devices and methods of the present disclosure without departing from the spirit or scope of the disclosure. Thus, it is intended that the present disclosure include modifications and variations that are within the scope of the subject disclosure and equivalents.

What is claimed is:

1. An electrical device including a rotational component having a boss rotationally disposed in a socket, the socket being formed in a housing, the housing including a sidewall that surrounds and defines the socket, wherein:
   the boss defines a circumferential groove about an exterior surface thereof, the circumferential groove being received within the socket; and
   the socket includes a protrusion that extends radially inwardly from the sidewall into the circumferential groove to permit the boss to rotate within the socket to form a rotatable connection between the boss and the socket, but prevents the boss from being pulled out of the socket, the protrusion being located at least partially within a passageway that extends outwardly through the sidewall of the housing, wherein the passageway is oriented along a direction that is not parallel to a centerline of the socket.

2. The electrical device of claim 1, wherein the protrusion includes a ball that resides at least partially within the passageway.

3. The electrical device of claim 2, wherein the passageway is threaded, and includes a set screw disposed therein that maintains the ball in engagement with the circumferential groove to trap the boss in the socket.

4. The electrical device of claim 1, wherein the circumferential groove is oriented orthogonally with respect to an axis of rotation of the boss within the socket.

5. The electrical device of claim 1, wherein the circumferential groove traverses 360 degrees around the boss.

6. The electrical device of claim 1, wherein the circumferential groove traverses less than 360 degrees around the boss to provide a range of rotational motion for the boss.

7. The electrical device of claim 2, wherein an external portion of the passageway is visually obscured from a viewer by another portion of the electrical device when the electrical device is assembled.

8. The electrical device of claim 1, wherein the boss defines a lengthwise bore through which an insulated electrical conductor can be directed.

9. The electrical device of claim 1, wherein the electrical device is a lighting device.

10. The electrical device of claim 9, wherein the lighting device includes a lamp.

11. The electrical device of claim 9, wherein the lighting device includes a luminaire.

12. The electrical device of claim 1, wherein the electrical device includes an articulating arm for a robot.

13. An electrical device, comprising:
   a housing defining a first bore therein to receive a rotational component therein and a second bore that intersects the first bore at a first end of the second bore, the second bore having a second end disposed at an outer surface of the housing to permit a protrusion to be introduced into the second bore through the outer surface of the housing;
   a rotational component having a boss rotationally disposed in the first bore, wherein the boss defines a circumferential groove about an exterior surface thereof, the circumferential groove being received within the first bore such that the circumferential groove aligns with the second bore; and
   a protrusion movably displaced within the second bore, the protrusion being selectively linearly displaceable along a linear direction defined by a centerline of the second bore so that the protrusion can be selectively advanced into the circumferential groove so that the protrusion is partially located within the circumferential groove and partially located within the second bore to form a rotatable connection between the boss and the socket that permits rotation of the boss about a centerline thereof and prevents the boss from being pulled out of the socket.

14. The electrical device of claim 13, wherein the protrusion includes a spherical bearing element that resides within the circumferential groove and the second bore at the same time.

15. The electrical device of claim 14, further comprising a fastener disposed within the second bore that retains the spherical bearing element in place.

16. The electrical device of claim 15, wherein the fastener includes a threaded fastener.

17. The electrical device of claim 13, wherein the circumferential groove traverses 360 degrees around the boss.

18. The electrical device of claim 13, wherein an external portion of the second bore is visually obscured from a viewer by another portion of the electrical device when the electrical device is assembled.

19. The electrical device of claim 1, wherein the boss defines a lengthwise passageway therethrough which an insulated electrical conductor can be directed.

20. The electrical device of claim 13, wherein the electrical device includes an articulating arm for a robot.

* * * * *